United States Patent
Vonog et al.

(10) Patent No.: US 8,571,956 B2
(45) Date of Patent: *Oct. 29, 2013

(54) SYSTEM ARCHITECTURE AND METHODS FOR COMPOSING AND DIRECTING PARTICIPANT EXPERIENCES

(75) Inventors: Stanislav Vonog, San Francisco, CA (US); Nikolay Surin, San Francisco, CA (US); Tara Lemmey, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,146

(22) Filed: Feb. 6, 2012

(65) Prior Publication Data

US 2012/0191586 A1  Jul. 26, 2012

Related U.S. Application Data

(63) Continuation of application No. 13/136,869, filed on Aug. 12, 2011, now Pat. No. 8,463,677.

(60) Provisional application No. 61/373,193, filed on Aug. 12, 2010.

(51) Int. Cl.
*G06Q 40/00* (2012.01)
*G06Q 40/02* (2012.01)

(52) U.S. Cl.
CPC ...................... *G06Q 40/02* (2013.01)
USPC ............. 705/35; 709/231; 709/232; 709/224; 370/352; 370/329; 715/753; 725/109; 713/153; 348/836

(58) Field of Classification Search
USPC .................. 370/352, 329; 709/231, 232, 224; 715/753; 725/109; 713/153; 348/836
See application file for complete search history.

(56) References Cited

U.S. PATENT DOCUMENTS 6,144,991 A   11/2000  England
7,171,485 B2 *  1/2007  Roach et al. .................. 709/232

(Continued)

FOREIGN PATENT DOCUMENTS

JP   2010-016662 A   1/2010
KR  10-2002-0038738 A   5/2002

(Continued)

OTHER PUBLICATIONS

Band of the hand: handheld media platforms from Palm OS to Pocket PC pose new challenges to video producers, but they also present new opportunities; Ettin, Scott A. EMedia, The Digital Studio Magazine, 16 , 1 , 44(12); Jan. 2003.*

(Continued)

*Primary Examiner* — Tien Nguyen
(74) *Attorney, Agent, or Firm* — Perkins Coie LLP

(57) ABSTRACT

The present invention contemplates a variety of improved methods and systems for providing an experience platform, as well as sentio or experience codecs, and experience agents for supporting the experience platform. The experience platform may be provided by a service provider to enable an experience provider to compose and direct a participant experience. The service provider monetizes the experience by charging the experience provider and/or the participants for services. The participant experience can involve one or more experience participants. The experience provider can create an experience with a variety of dimensions and features. As will be appreciated, the following description provides one paradigm for understanding the multi-dimensional experience available to the participants. There are many suitable ways of describing, characterizing and implementing the experience platform contemplated herein.

20 Claims, 19 Drawing Sheets

(56) References Cited

U.S. PATENT DOCUMENTS

| | | | |
|---|---|---|---|
| 7,516,255 B1 | 4/2009 | Hobbs | |
| 7,529,259 B2* | 5/2009 | Van Acker et al. | 370/412 |
| 7,760,640 B2* | 7/2010 | Brown et al. | 370/235 |
| 8,171,154 B2 | 5/2012 | Vonog et al. | |
| 8,234,398 B2 | 7/2012 | Vonog et al. | |
| 8,255,552 B2 | 8/2012 | Witt et al. | |
| 2003/0074554 A1* | 4/2003 | Roach et al. | 713/153 |
| 2003/0217170 A1 | 11/2003 | Nelson et al. | |
| 2004/0128350 A1 | 7/2004 | Topfl et al. | |
| 2007/0217436 A1* | 9/2007 | Markley et al. | 370/401 |
| 2007/0271580 A1 | 11/2007 | Tischer et al. | |
| 2008/0004888 A1 | 1/2008 | Davis et al. | |
| 2008/0039205 A1* | 2/2008 | Ackley et al. | 463/40 |
| 2008/0139301 A1 | 6/2008 | Holthe | |
| 2008/0158373 A1 | 7/2008 | Chu | |
| 2008/0205426 A1* | 8/2008 | Grover et al. | 370/429 |
| 2009/0013263 A1 | 1/2009 | Fortnow et al. | |
| 2009/0046139 A1 | 2/2009 | Cutler et al. | |
| 2009/0100452 A1 | 4/2009 | Hudgeons et al. | |
| 2009/0183205 A1 | 7/2009 | McCartie et al. | |
| 2009/0186700 A1 | 7/2009 | Konkle | |
| 2009/0239587 A1 | 9/2009 | Negron et al. | |
| 2010/0149096 A1 | 6/2010 | Migos et al. | |
| 2010/0156812 A1 | 6/2010 | Stallings et al. | |
| 2010/0185514 A1 | 7/2010 | Glazer et al. | |
| 2010/0278508 A1 | 11/2010 | Aggarwal | |
| 2011/0103374 A1 | 5/2011 | Lajoie et al. | |
| 2011/0246908 A1 | 10/2011 | Akram et al. | |
| 2012/0038550 A1 | 2/2012 | Lemmey et al. | |
| 2012/0039382 A1 | 2/2012 | Vonog et al. | |
| 2012/0041869 A1 | 2/2012 | Vonog et al. | |
| 2012/0060101 A1 | 3/2012 | Vonog et al. | |
| 2012/0082226 A1 | 4/2012 | Weber | |
| 2012/0191586 A1 | 7/2012 | Vonog et al. | |

FOREIGN PATENT DOCUMENTS

| | | |
|---|---|---|
| KR | 10-2006-0062381 A | 6/2006 |
| KR | 2006-0083034 A | 7/2006 |
| KR | 10-2008-0008340 A | 1/2008 |
| KR | 10-2009-0113158 A | 10/2009 |
| KR | 10-2010-0098668 A | 9/2010 |
| WO | WO-02-41121 A2 | 5/2002 |
| WO | WO-2008/072923 A1 | 6/2008 |

OTHER PUBLICATIONS

Radvision to Bring Scalable Video Coding (SVC) Technology to SCOPIA Conferencing Platform; Business Wire , p. NA; Apr. 21, 2009.*

Band of the hand: handheld media platforms from Palm OS to Pocket PC pose new challenges to video producers, but they also present new opportunities; Ettin, Scott A. EMedia, The Digital Studio Magazine, 16, 1, 44(12); Jan. 2003.*

Broadcom Announces Industry's Most Advanced High Definition AVC Encoder/Transcoder that Transforms the PC into a Multimedia Server. PR Newswire, p NA; Jan. 7, 2008.*

Moving toward a dual-infrastructure facility; Moote, Stan; Suite, Steve; Roth, Todd; Kanaan, Nabil Broadcast Engineering v46n9 pp. 72-78; Sep. 2004.*

International Search Report PCT/US2011/001424 dated Apr. 6, 2012, pp. 1-3.

Written Opinion PCT/US2011/001424 dated Apr. 6, 2012, pp. 1-3.

International Search Report PCT/US2011/001425 dated Apr. 6, 2012, pp. 1-3.

Written Opinion PCT/US2011/001425 dated Apr. 6, 2012, pp. 1-3.

Co-Pending U.S. Appl. No. 13/136,869 of Vonog, S., et al., filed Aug. 12, 2011.

Co-Pending U.S. Appl. No. 13/136,870 of Vonog, S., et al., flied Aug. 12, 2011.

Co-Pending U.S. Appl. No. 13/363,187 of Vonog, S., et al., filed Jan. 31, 2012.

Co-Pending U.S. Appl. No. 13/221,801 of Vonog, S., et al., filed Aug. 30, 2011.

International Search Report mailed May 16, 2012 of PCT Application No. PCT/US2011/057385, 9 pages.

Written Opinion mailed May 16, 2012 of PCT Application No. PCT/US2011/057385, 4 pages.

Co-Pending U.S. Appl. No. 13/279,096 of Vonog, S., et al., filed Oct. 21, 2011.

Co-Pending U.S. Appl. No. 13/461,680 of Vonog, S., et al., filed May 1, 2012.

Co-Pending U.S. Appl. No. 13/546,906 of Vonog, S., et al., filed Jul. 11, 2012.

Co-Pending U.S. Appl. No. 13/694,582, filed Dec. 12, 2012.

Co-Pending U.S. Appl. No. 13/694,581, filed Dec. 12, 2012.

Non-Final Office Action mailed Sep. 11, 2012, in Co-Pending U.S. Appl. No. 13/136,869, filed Sep. 7, 2012.

Notice of Allowance mailed Feb. 4, 2013, in Co-Pending U.S. Appl. No. 13/279,096, filed Oct. 21, 2011.

Co-Pending U.S. Appl. No. 13/210,370 of Lemmey, T., et al., filed Aug. 15, 2011.

International Search Report PCT/US2011/047814 dated Apr. 9, 2012, pp. 1-3.

International Search Report PCT/US2011/047815 dated Apr. 9, 2012, pp. 1-3.

Written Opinion PCT/US2011/047814 dated Apr. 9, 2012, pp. 1-5.

Written Opinion PCT/US2011/047815 dated Apr. 9, 2012, pp. 1-4.

Co-Pending U.S. Appl. No. 13/762,149 of Vonog. S., filed Feb. 7, 2013.

Notice of Allowance mailed Apr. 3, 2013, in Co-Pending U.S. Appl. No. 13/163,869, filed Sep. 7, 2012.

Non-Final Office Action mailed Apr. 1, 2013, in Co-Pending U.S. Appl. No. 13/221,801, filed Aug. 30, 2011.

* cited by examiner

Tasks

| Name | Activator | Command | State | Slave | ID | Age | Active |
|---|---|---|---|---|---|---|---|
| Merger | xdLAQodf | Python Code | Running | powerslave | 308 | 00:00:10 | 00:00:10 |
| Encoder #0 | - | Python Code | Finished | - | - | 00:00:09 | 00:00:08 |
| Encoder #1 | xdLAQodf | Python Code | Running | i-ble946da | 205 | 00:00:09 | 00:00:09 |
| Encoder #2 | xdLAQodf | Python Code | Running | i-b7e946dc | 204 | 00:00:09 | 00:00:09 |
| Encoder #3 | xdLAQodf | Python Code | Running | i-b7e946dc | 205 | 00:00:09 | 00:00:09 |
| Encoder #4 | xdLAQodf | Python Code | Running | i-b7e946dc | 206 | 00:00:09 | 00:00:09 |
| Encoder #5 | xdLAQodf | Python Code | Running | i-b7e946dc | 207 | 00:00:09 | 00:00:09 |
| Encoder #6 | - | Python Code | Finished | - | - | 00:00:09 | 00:00:09 |
| Encoder #7 | xdLAQodf | Python Code | Running | i-ble946da | 208 | 00:00:09 | 00:00:09 |
| Encoder #8 | xdLAQodf | Python Code | Running | i-ble946da | 207 | 00:00:09 | 00:00:09 |
| Encoder #9 | xdLAQodf | Python Code | Running | powerslave | 310 | 00:00:09 | 00:00:09 |
| Encoder #10 | xdLAQodf | Python Code | Running | powerslave | 311 | 00:00:09 | 00:00:09 |
| Encoder #11 | - | Python Code | Finished | - | - | 00:00:09 | 00:00:04 |

Activators

| Name | Connected |
|---|---|
| xdLAQodf | Yes |

Slaves

| Name | Ready | Load | Capacity |
|---|---|---|---|
| i-ble946da | Yes | 3 | 4 |
| powerslave | Yes | 3 | 5 |
| i-b7e946dc | No | 4 | 4 |

FIG. 18

SYSTEM ARCHITECTURE AND METHODS FOR COMPOSING AND DIRECTING PARTICIPANT EXPERIENCES

CROSS-REFERENCE TO RELATED APPLICATIONS

The present application is a continuation of U.S. patent application Ser. No. 13/136,869, now U.S. Pat. No. 8,463,677, entitled "System and Methods for Experiential Computing", Filed Aug. 12, 2011, which claims the benefit of and priority to U.S. Provisional Patent Application No. 61/373,193 entitled "System Architecture and Methods for Composing and Directing Participant Experiences," filed on Aug. 12, 2010, both of which are herby, incorporated by reference.

BACKGROUND OF INVENTION

Field of Invention

The present teaching relates to experience platforms enabling an experience provider the direct and compose an experience for one or more participants, which experience may involve a variety of dimensions including video, group participation, gesture recognition, heterogeneous device use, emotions, etc.

SUMMARY OF THE INVENTION

The present invention contemplates a variety of improved methods and systems for providing an experience platform, as well as sentio or experience codecs, and experience agents for supporting the experience platform. The experience platform may be provided by a service provider to enable an experience provider to compose and direct a participant experience. The service provider monetizes the experience by charging the experience provider and/or the participants for services. The participant experience can involve one or more experience participants. The experience provider can create an experience with a variety of dimensions and features. As will be appreciated, the following description provides one paradigm for understanding the multi-dimensional experience available to the participants. There are many suitable ways of describing, characterizing and implementing the experience platform contemplated herein.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

FIG. 17-19 illustrate a demonstration of a video transcoding service utilized by the transcoding application, and incorporating a third-party service

DETAILED DESCRIPTION OF THE INVENTION

Figure 1:
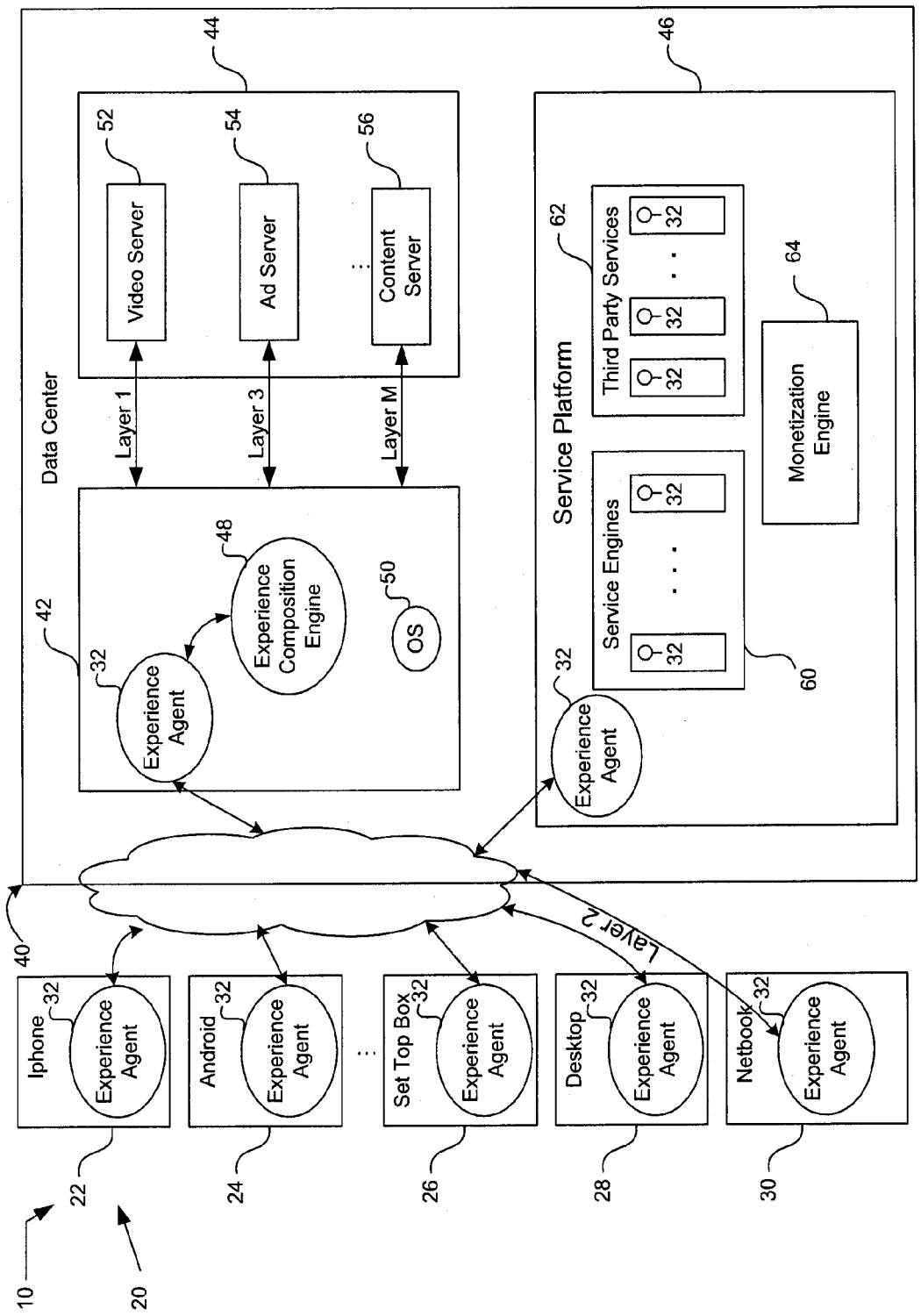
FIG. 1 illustrates a system architecture for composing and directing user experiences.

FIG. 1 illustrates a block diagram of a system 10. The system 10 can be viewed as an "experience platform" or system architecture for composing and directing a participant experience. In one embodiment, the experience platform 10 is provided by a service provider to enable an experience provider to compose and direct a participant experience. The participant experience can involve one or more experience participants. The experience provider can create an experience with a variety of dimensions, as will be explained further now. As will be appreciated, the following description provides one paradigm for understanding the multi-dimensional experience available to the participants. There are many suitable ways of describing, characterizing and implementing the experience platform contemplated herein.

In general, services are defined at an API layer of the experience platform. The services are categorized into "dimensions." The dimension(s) can be recombined into "layers." The layers form to make features in the experience.

By way of example, the following are some of the dimensions that can be supported on the experience platform.

Video—is the near or substantially real-time streaming of the video portion of a video or film with near real-time display and interaction.

Audio—is the near or substantially real-time streaming of the audio portion of a video, film, karaoke track, song, with near real-time sound and interaction.

Live—is the live display and/or access to a live video, film, or audio stream in near real-time that can be controlled by another experience dimension. A live display is not limited to single data stream.

Encore—is the replaying of a live video, film or audio content. This replaying can be the raw version as it was originally experienced, or some type of augmented version that has been edited, remixed, etc.

Graphics—is a display that contains graphic elements such as text, illustration, photos, freehand geometry and the attributes (size, color, location) associated with these elements. Graphics can be created and controlled using the experience input/output command dimension(s) (see below).

Input/Output Command(s)—are the ability to control the video, audio, picture, display, sound or interactions with human or device-based controls. Some examples of input/output commands include physical gestures or movements, voice/sound recognition, and keyboard or smart-phone device input(s).

Interaction—is how devices and participants interchange and respond with each other and with the content (user experience, video, graphics, audio, images, etc.) displayed in an experience. Interaction can include the defined behavior of an artifact or system and the responses provided to the user and/or player.

Game Mechanics—are rule-based system(s) that facilitate and encourage players to explore the properties of an experience space and other participants through the use of feedback mechanisms. Some services on the experience Platform that could support the game mechanics dimensions include leader boards, polling, like/dislike, featured players, star-ratings, bidding, rewarding, role-playing, problem-solving, etc.

Ensemble—is the interaction of several separate but often related parts of video, song, picture, story line, players, etc. that when woven together create a more engaging and immersive experience than if experienced in isolation.

Auto Tune—is the near real-time correction of pitch in vocal and/or instrumental performances. Auto Tune is used to disguise off-key inaccuracies and mistakes, and allows singer/players to hear back perfectly tuned vocal tracks without the need of singing in tune.

Auto Filter—is the near real-time augmentation of vocal and/or instrumental performances. Types of augmentation could include speeding up or slowing down the playback, increasing/decreasing the volume or pitch, or applying a celebrity-style filter to an audio track (like a Lady Gaga or Heavy-Metal filter).

Remix—is the near real-time creation of an alternative version of a song, track, video, image, etc. made from an original version or multiple original versions of songs, tracks, videos, images, etc.

Viewing 360°/Panning—is the near real-time viewing of the 360° horizontal movement of a streaming video feed on a fixed axis. Also the ability to for the player(s) to control and/or display alternative video or camera feeds from any point designated on this fixed axis.

Turning back to FIG. 1, the experience platform 10 includes a plurality of devices 20 and a data center 40. The devices 12 may include devices such as an iPhone 22, an android 24, a set top box 26, a desktop computer 28, and a netbook 30. At least some of the devices 12 may be located in proximity with each other and coupled via a wireless network. In certain embodiments, a participant utilizes multiple devices 12 to enjoy a heterogeneous experience, such as using the iPhone 22 to control operation of the other devices. Multiple participants may also share devices at one location, or the devices may be distributed across various locations for different participants.

Each device 12 has an experience agent 32. The experience agent 32 includes a sentio codec and an API. The sentio codec and the API enable the experience agent 32 to communicate with and request services of the components of the data center 40. The experience agent 32 facilitates direct interaction between other local devices. Because of the multi-dimensional aspect of the experience, the sentio codec and API are required to fully enable the desired experience. However, the functionality of the experience agent 32 is typically tailored to the needs and capabilities of the specific device 12 on which the experience agent 32 is instantiated. In some embodiments, services implementing experience dimensions are implemented in a distributed manner across the devices 12 and the data center 40. In other embodiments, the devices 12 have a very thin experience agent 32 with little functionality beyond a minimum API and sentio codec, and the bulk of the services and thus composition and direction of the experience are implemented within the data center 40.

Data center 40 includes an experience server 42, a plurality of content servers 44, and a service platform 46. As will be appreciated, data center 40 can be hosted in a distributed manner in the "cloud," and typically the elements of the data center 40 are coupled via a low latency network. The experience server 42, servers 44, and service platform 46 can be implemented on a single computer system, or more likely distributed across a variety of computer systems, and at various locations.

The experience server 42 includes at least one experience agent 32, an experience composition engine 48, and an operating system 50. In one embodiment, the experience composition engine 48 is defined and controlled by the experience provider to compose and direct the experience for one or more participants utilizing devices 12. Direction and composition is accomplished, in part, by merging various content layers and other elements into dimensions generated from a variety of sources such as the service provider 42, the devices 12, the content servers 44, and/or the service platform 46.

The content servers 44 may include a video server 52, an ad server 54, and a generic content server 56. Any content suitable for encoding by an experience agent can be included as an experience layer. These include well know forms such as video, audio, graphics, and text. As described in more detail earlier and below, other forms of content such as gestures, emotions, temperature, proximity, etc., are contemplated for encoding and inclusion in the experience via a sentio codec, and are suitable for creating dimensions and features of the experience.

The service platform 46 includes at least one experience agent 32, a plurality of service engines 60, third party service engines 62, and a monetization engine 64. In some embodiments, each service engine 60 or 62 has a unique, corresponding experience agent. In other embodiments, a single experience 32 can support multiple service engines 60 or 62. The service engines and the monetization engines 64 can be instantiated on one server, or can be distributed across multiple servers. The service engines 60 correspond to engines generated by the service provider and can provide services such as audio remixing, gesture recognition, and other services referred to in the context of dimensions above, etc. Third party service engines 62 are services included in the service platform 46 by other parties. The service platform 46 may have the third-party service engines instantiated directly therein, or within the service platform 46 these may correspond to proxies which in turn make calls to servers under control of the third-parties.

Monetization of the service platform 46 can be accomplished in a variety of manners. For example, the monetization engine 64 may determine how and when to charge the experience provider for use of the services, as well as tracking for payment to third-parties for use of services from the third-party service engines 62.

Figure 2:
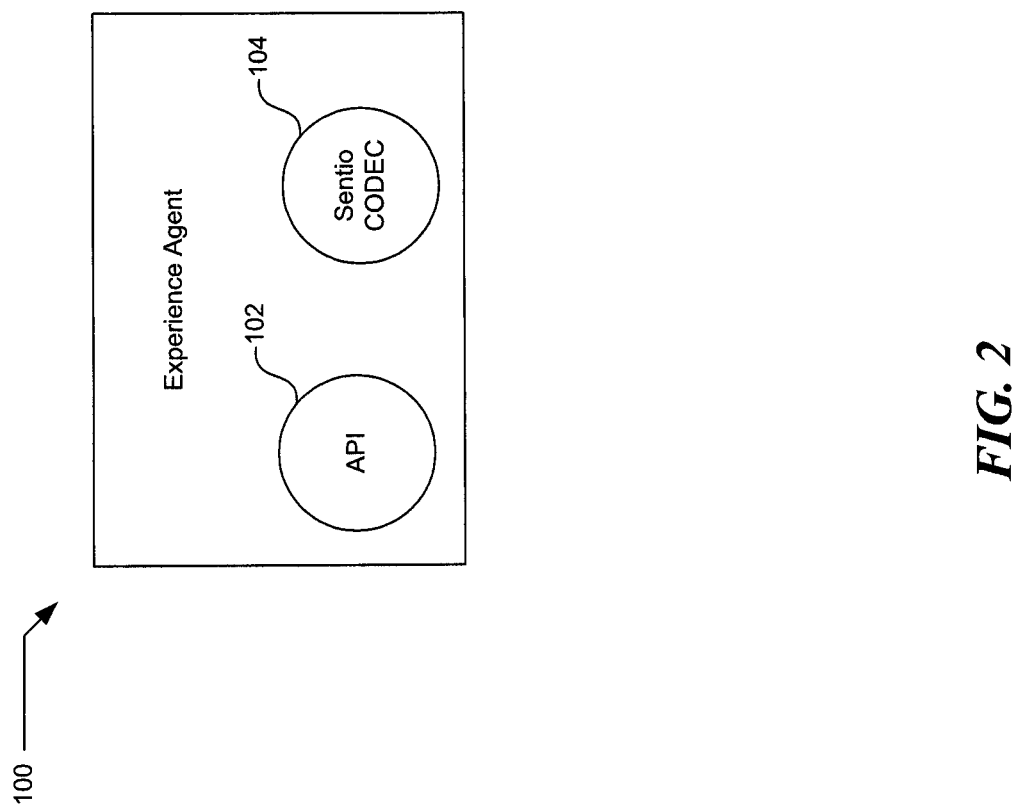
FIG. 2 is a block diagram of an experience agent.

FIG. 2 illustrates a block diagram of an experience agent 100. The experience agent 100 includes an application programming interface (API) 102 and a sentio codec 104. The API 102 is an interface which defines available services, and enables the different agents to communicate with one another and request services.

The sentio codec 104 is a combination of hardware and/or software which enables encoding of many types of data streams for operations such as transmission and storage, and decoding for operations such as playback and editing. These data streams can include standard data such as video and audio. Additionally, the data can include graphics, sensor data, gesture data, and emotion data. ("Sentio" is Latin roughly corresponding to perception or to perceive with one's senses, hence the nomenclature "sentio codec.")

Figure 3:
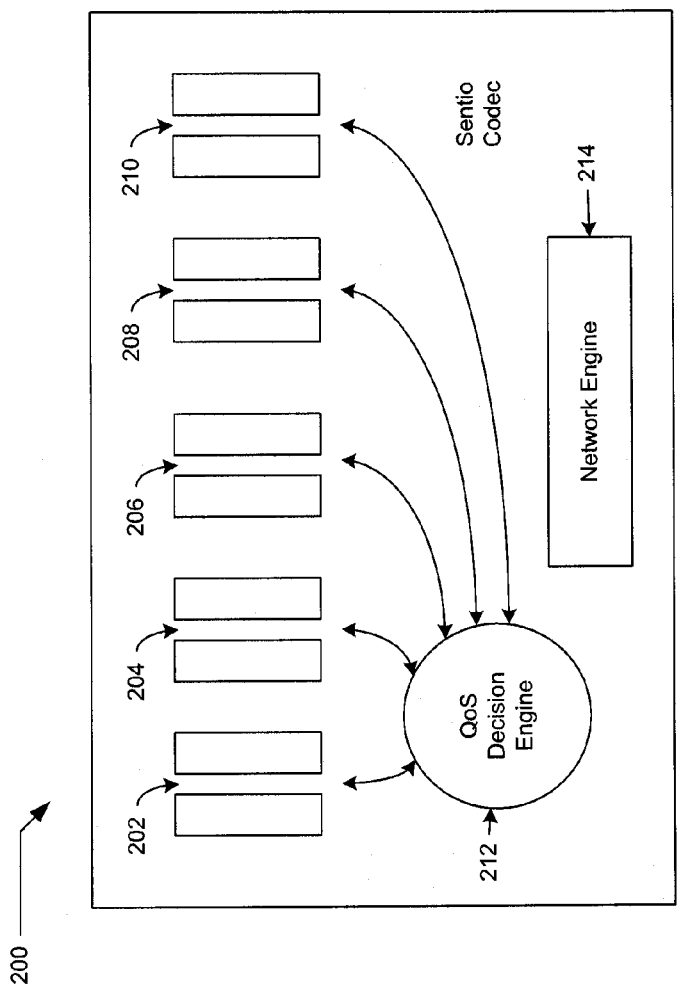
FIG. 3 is a block diagram of a sentio codec.

FIG. 3 illustrates a block diagram of a sentio codec 200. The sentio codec 200 includes a plurality of codecs such as video codecs 202, audio codecs 204, graphic language codecs 206, sensor data codecs 208, and emotion codecs 210. The sentio codec 200 further includes a quality of service (QoS) decision engine 212 and a network engine 214. The codecs, the QoS decision engine 212, and the network engine 214 work together to encode one or more data streams and transmit the encoded data according to a low-latency transfer protocol supporting the various encoded data types. One example of this low-latency protocol is described in more detail in Vonog et al.'s U.S. patent application Ser. No. 12/569,876, filed Sep. 29, 2009, and incorporated herein by reference for all purposes including the low-latency protocol and related features such as the network engine and network stack arrangement.

The sentio codec 200 can be designed to take all aspects of the experience platform into consideration when executing the transfer protocol. The parameters and aspects include available network bandwidth, transmission device characteristics and receiving device characteristics. Additionally, the sentio codec 200 can be implemented to be responsive to commands from an experience composition engine or other outside entity to determine how to prioritize data for transmission. In many applications, because of human response, audio is the most important component of an experience data stream. However, a specific application may desire to emphasize video or gesture commands.

The sentio codec provides the capability of encoding data streams corresponding to many different senses or dimensions of an experience. For example, a device 12 may include a video camera capturing video images and audio from a participant. The user image and audio data may be encoded and transmitted directly or, perhaps after some intermediate processing, via the experience composition engine 48, to the service platform 46 where one or a combination of the service engines can analyze the data stream to make a determination about an emotion of the participant. This emotion can then be encoded by the sentio codec and transmitted to the experience composition engine 48, which in turn can incorporate this into a dimension of the experience. Similarly a participant gesture can be captured as a data stream, e.g. by a motion sensor or a camera on device 12, and then transmitted to the service platform 46, where the gesture can be interpreted, and transmitted to the experience composition engine 48 or directly back to one or more devices 12 for incorporation into a dimension of the experience.

Figure 4:
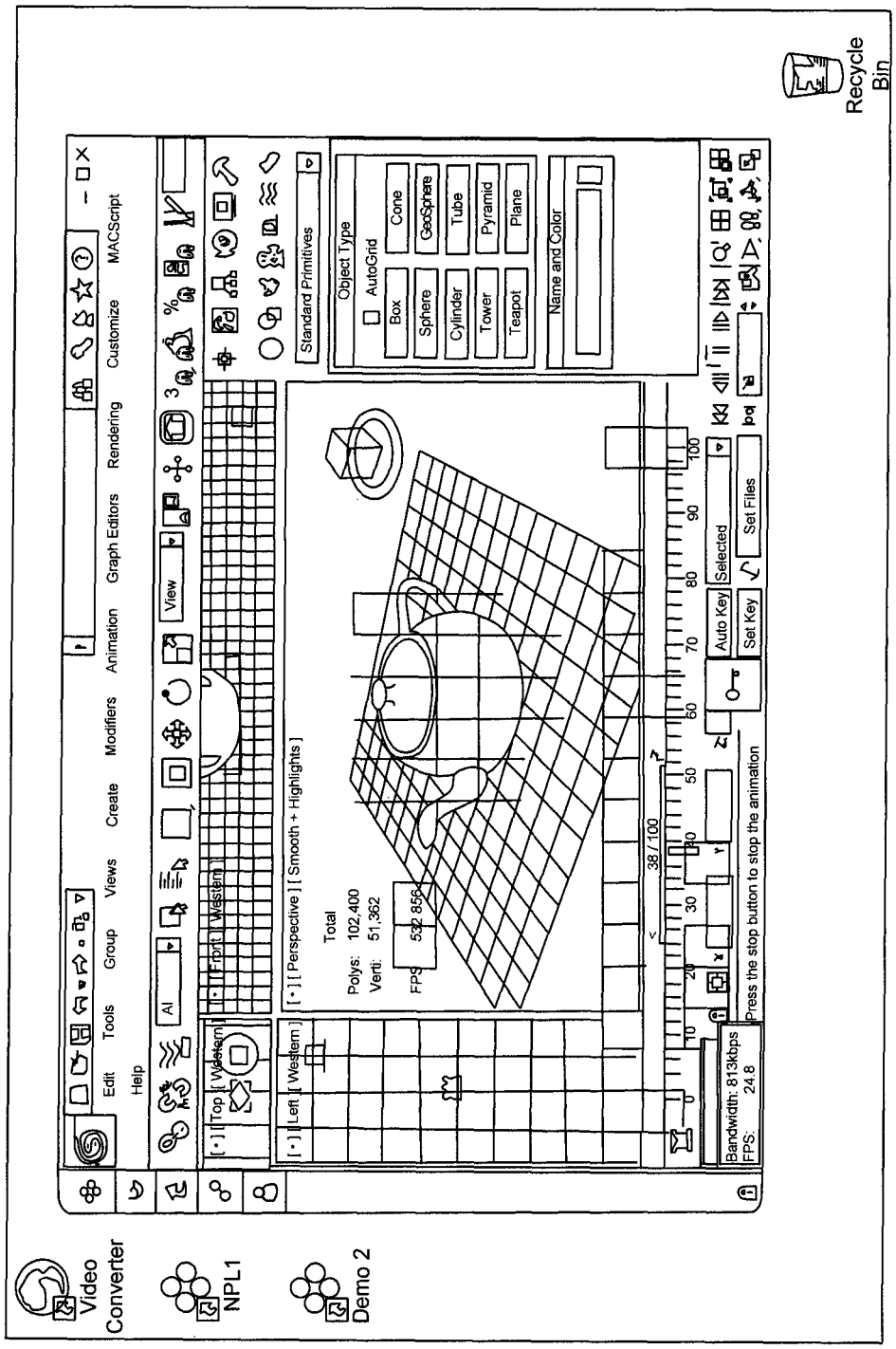
FIGS. 4-16 illustrate several example experiences involving the merger of various layers including served video, video chat, PowerPoint, and other services.
Figure 5:
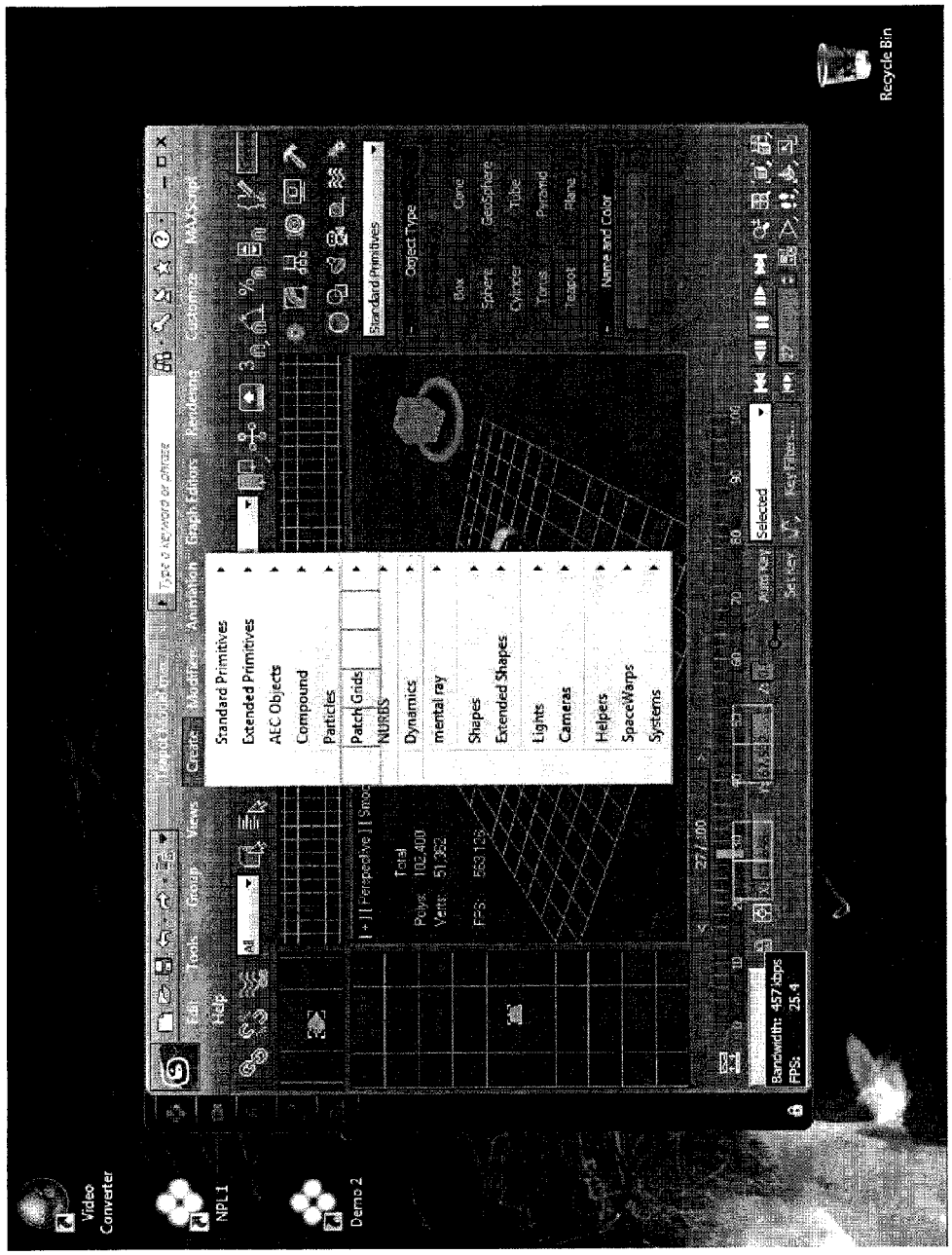

FIGS. 4-5 provide an example experience showing 4 layers. A first layer is generated Autodesk 3ds Max instantiated on a suitable layer source, such as on an experience server or a content server. A second layer is an interactive frame around the 3ds Max layer, and in this example is generated on a client device by an experience agent. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the 3ds Max layer on the experience server.

Figure 6:
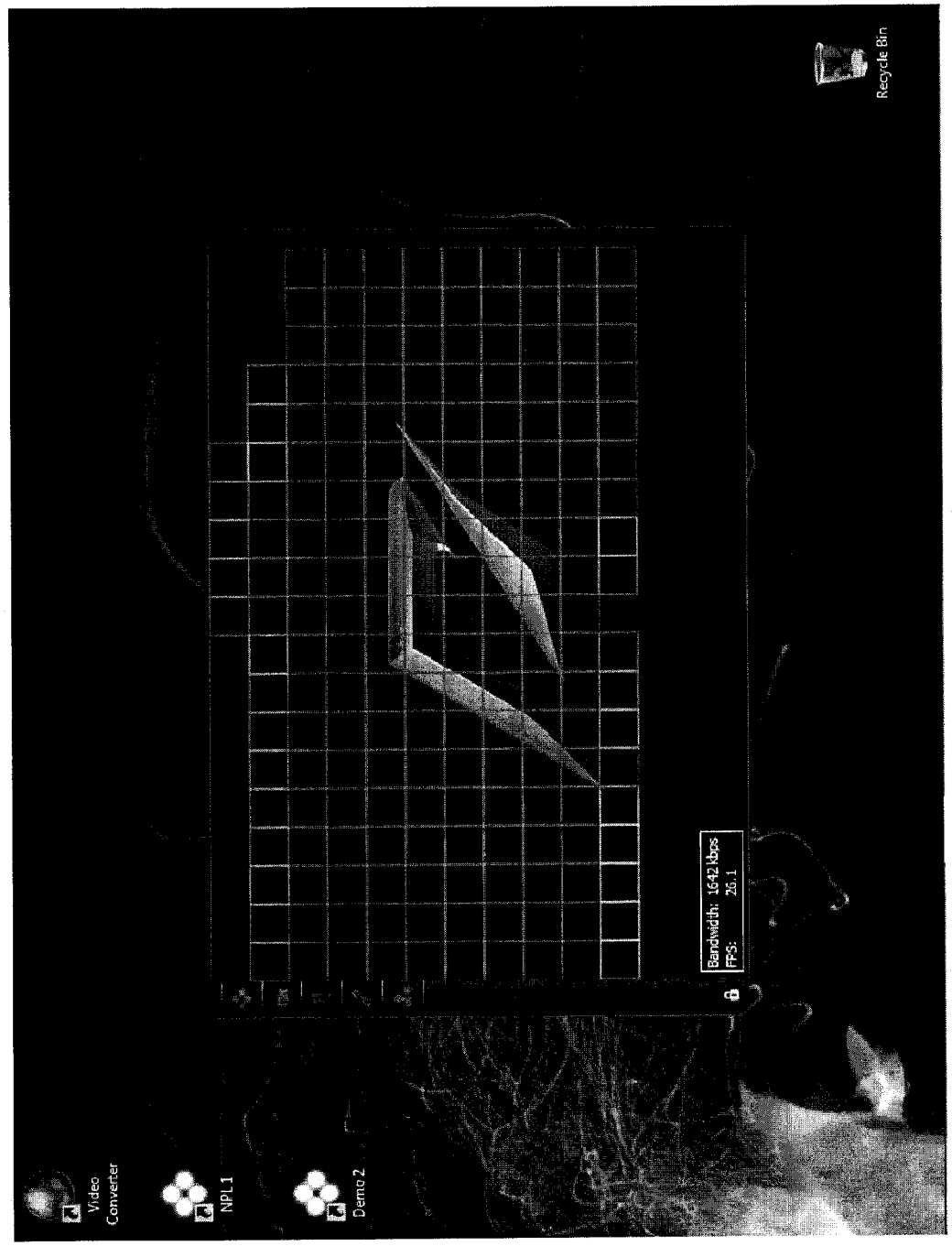
Figure 7:
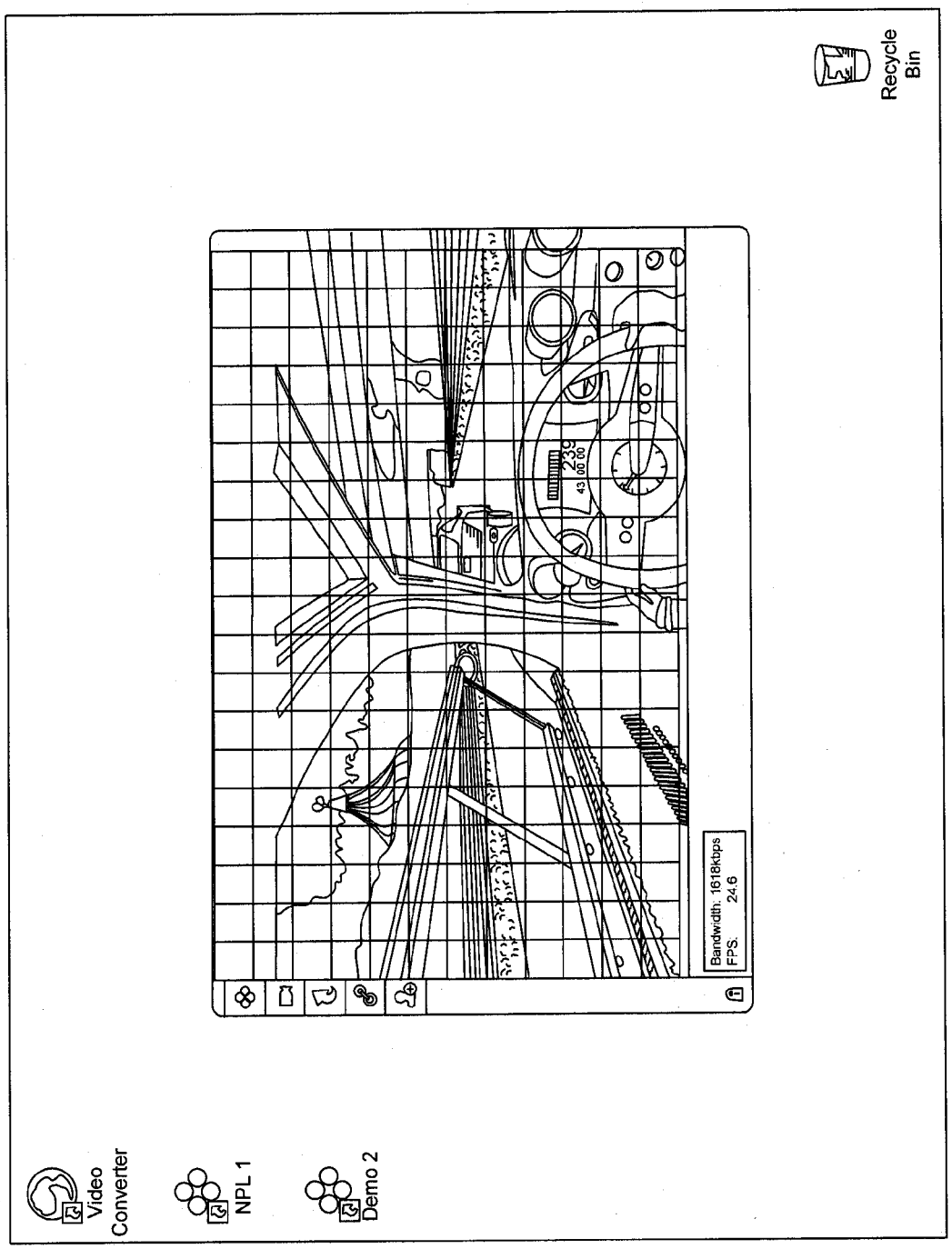

FIGS. 6-7, similar to FIGS. 4-5, show four layers, but in this case instead of a 3ds Max base layer, a first layer is generated by piece of code developed by EA and called "Need for Speed." A second layer is an interactive frame around the Need for Speed layer, and may be generated on a client device by an experience agent, on the service platform, or on the experience platform. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the Need for Speed layer on the experience server.

Figure 8:
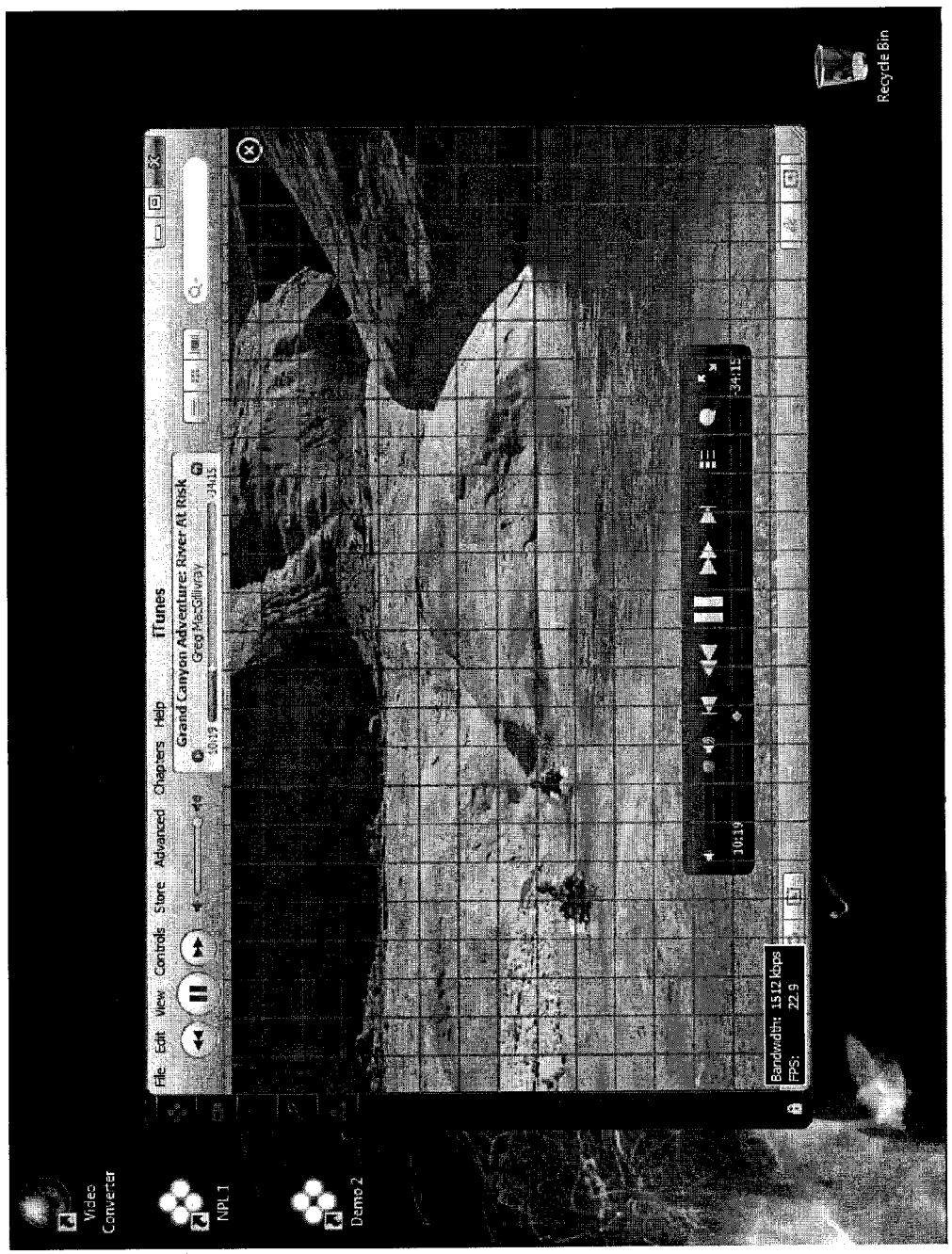
Figure 9:
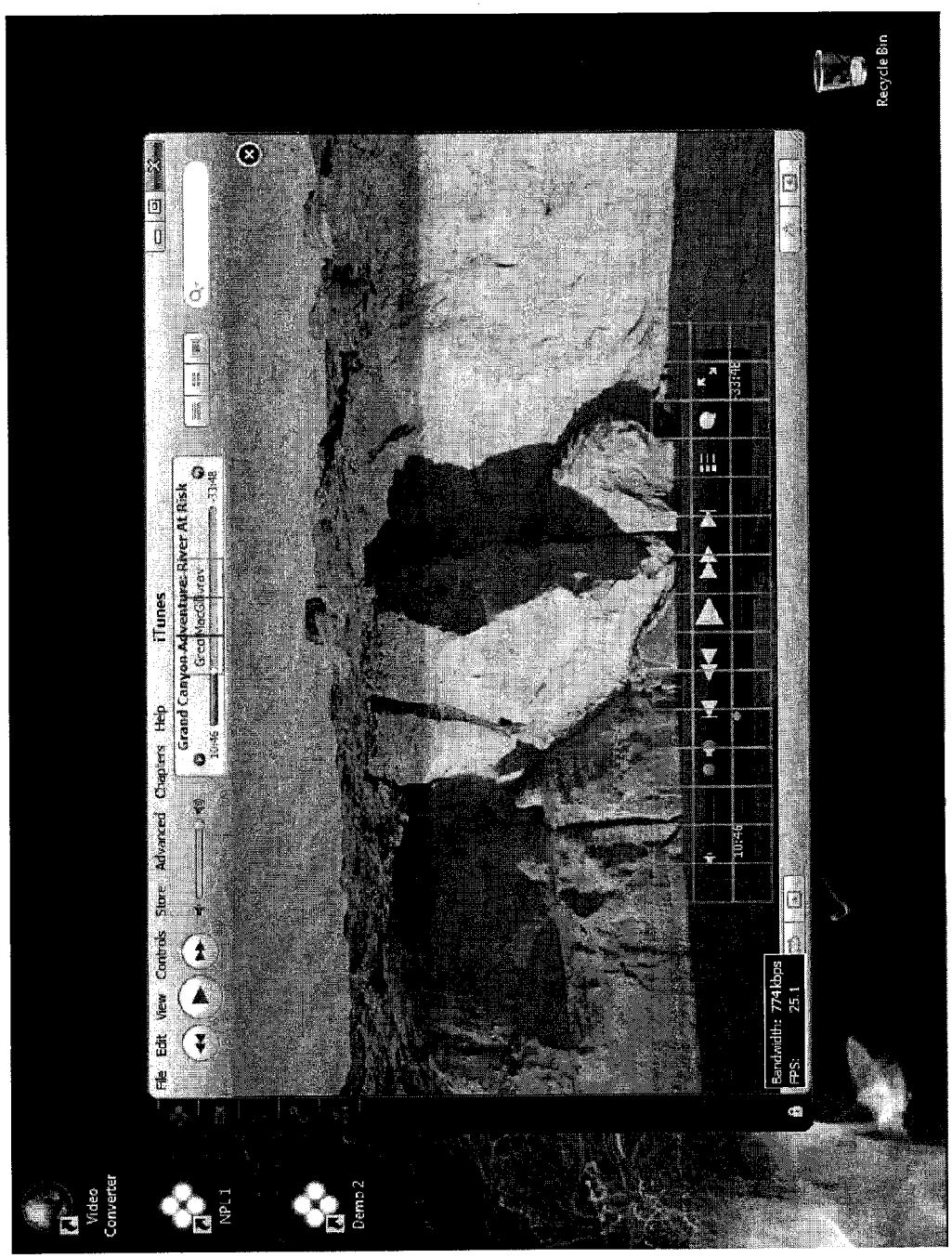
Figure 10:
Figure 11:
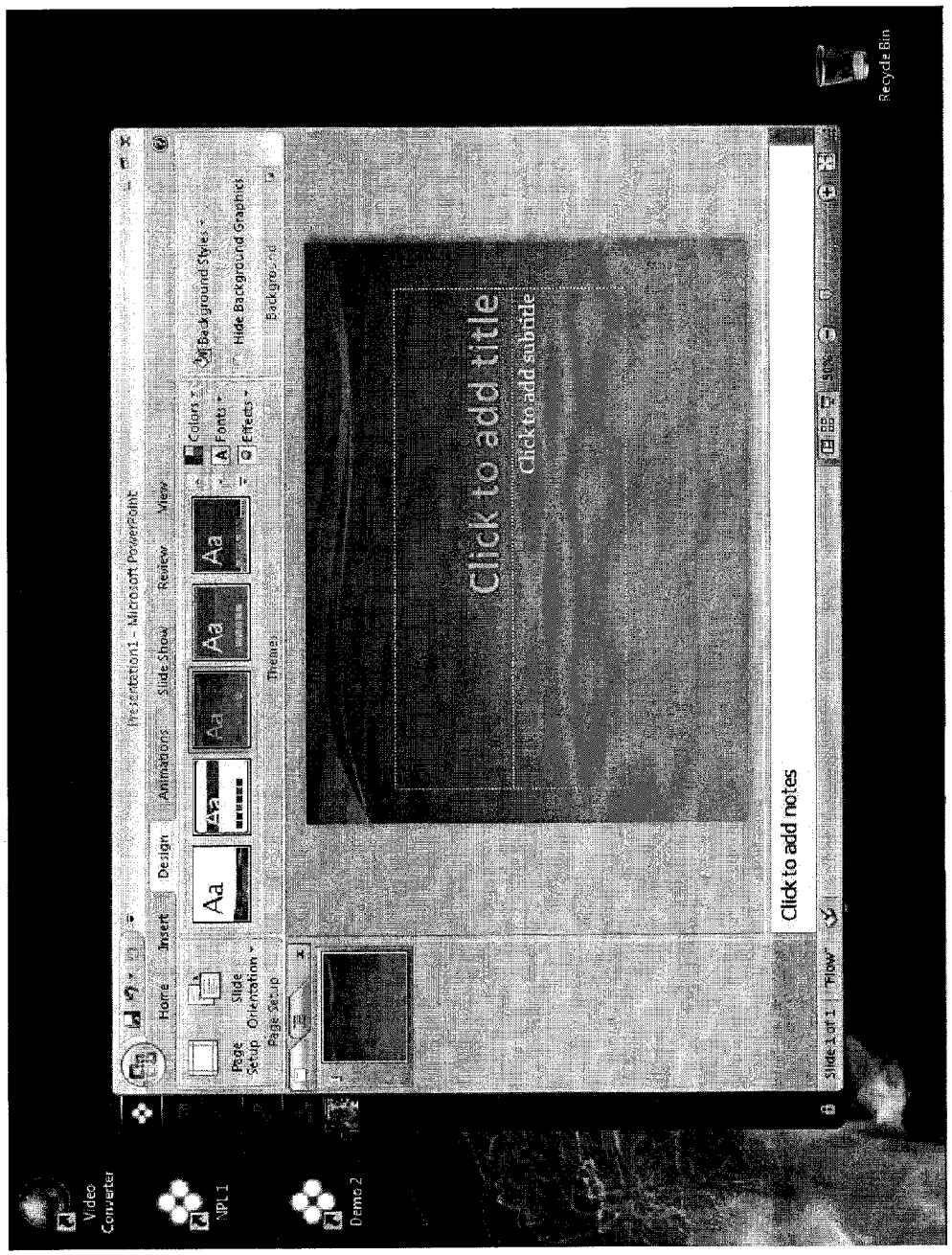

FIGS. 8-9 illustrate a base layer being a movie with DRM protection provided by iTunes/Apple iTunes store, the base layer here being provided by a video server, and merged on the experience platform.

Figure 12:
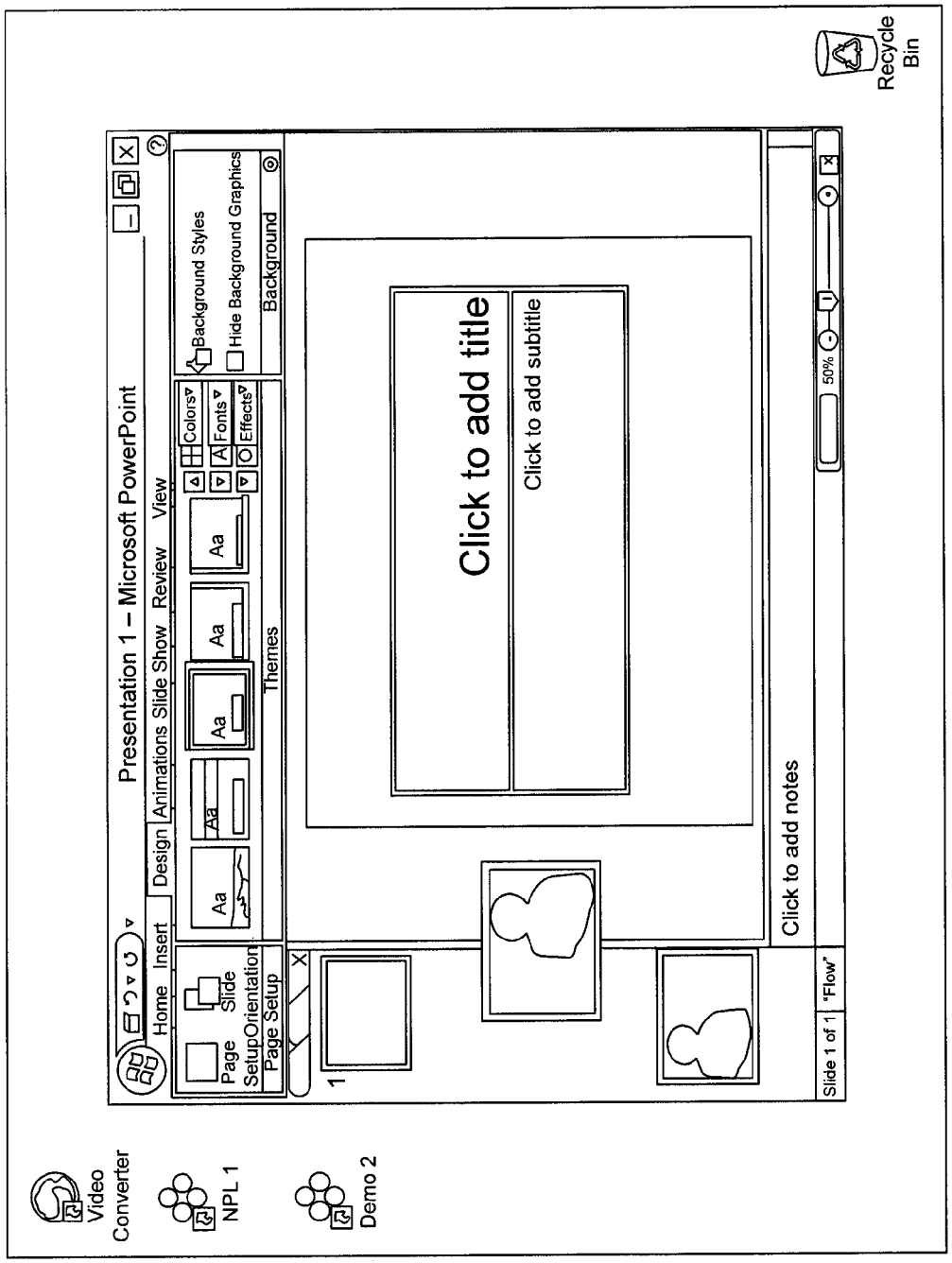
Figure 13:
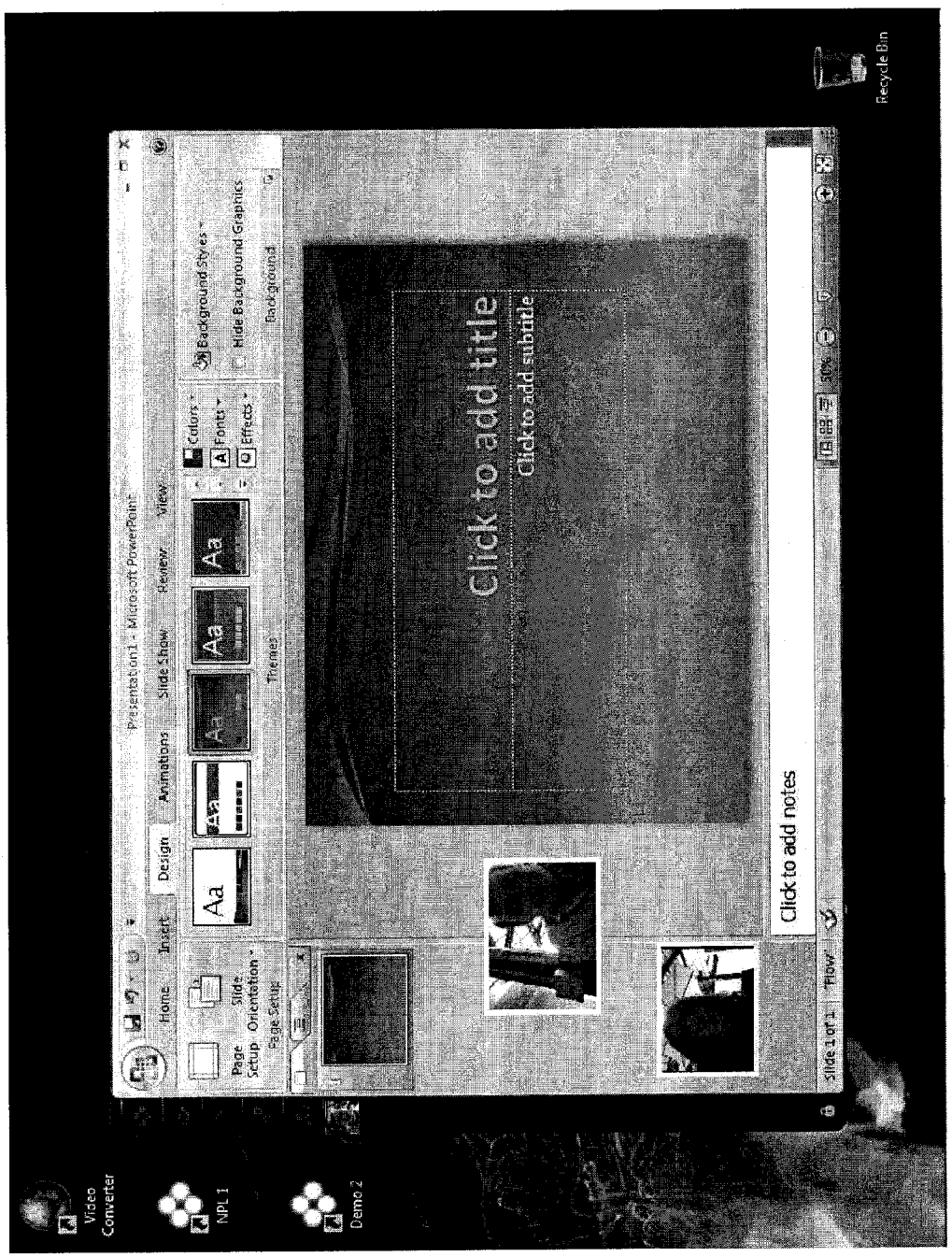
Figure 14:
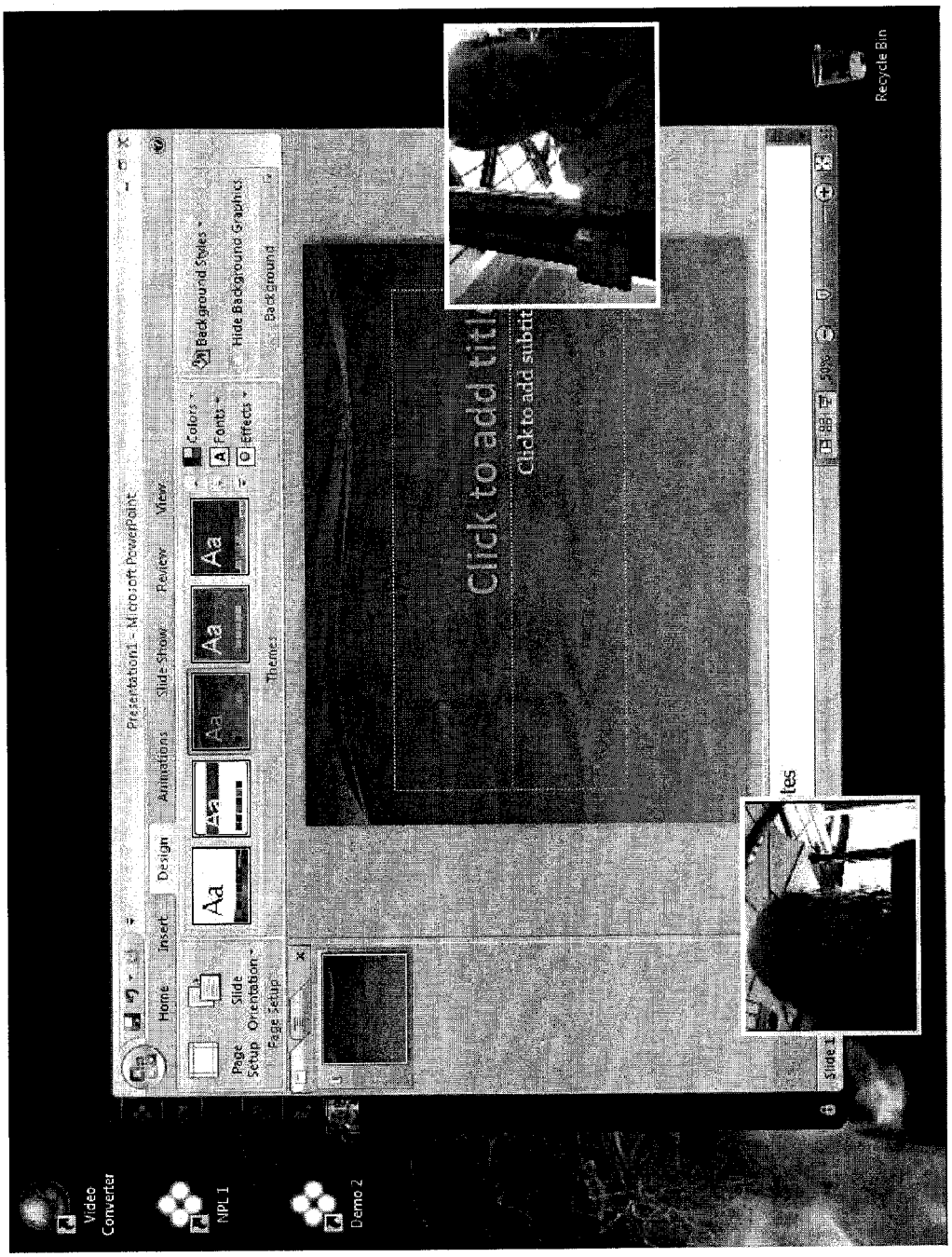
Figure 15:
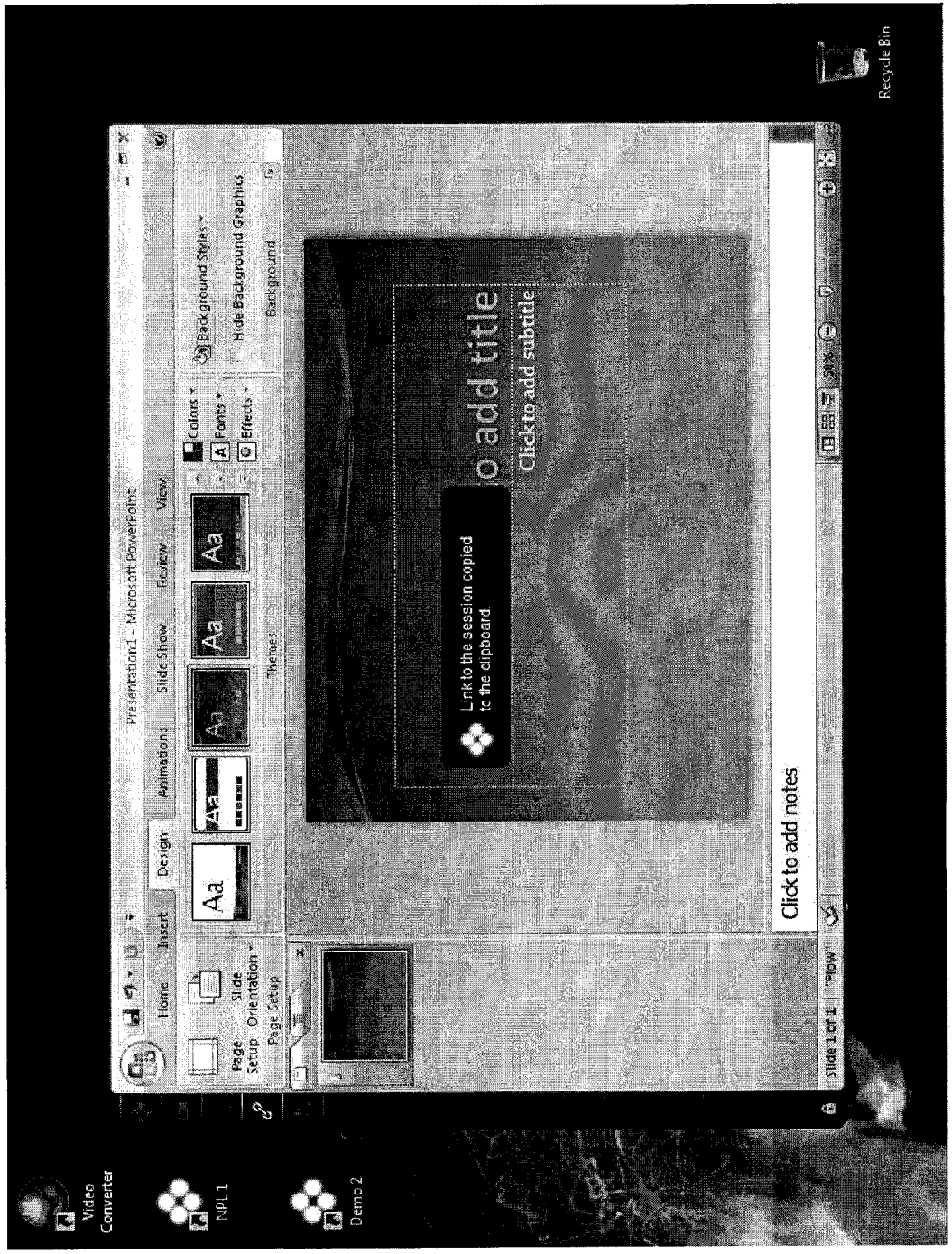
Figure 16:
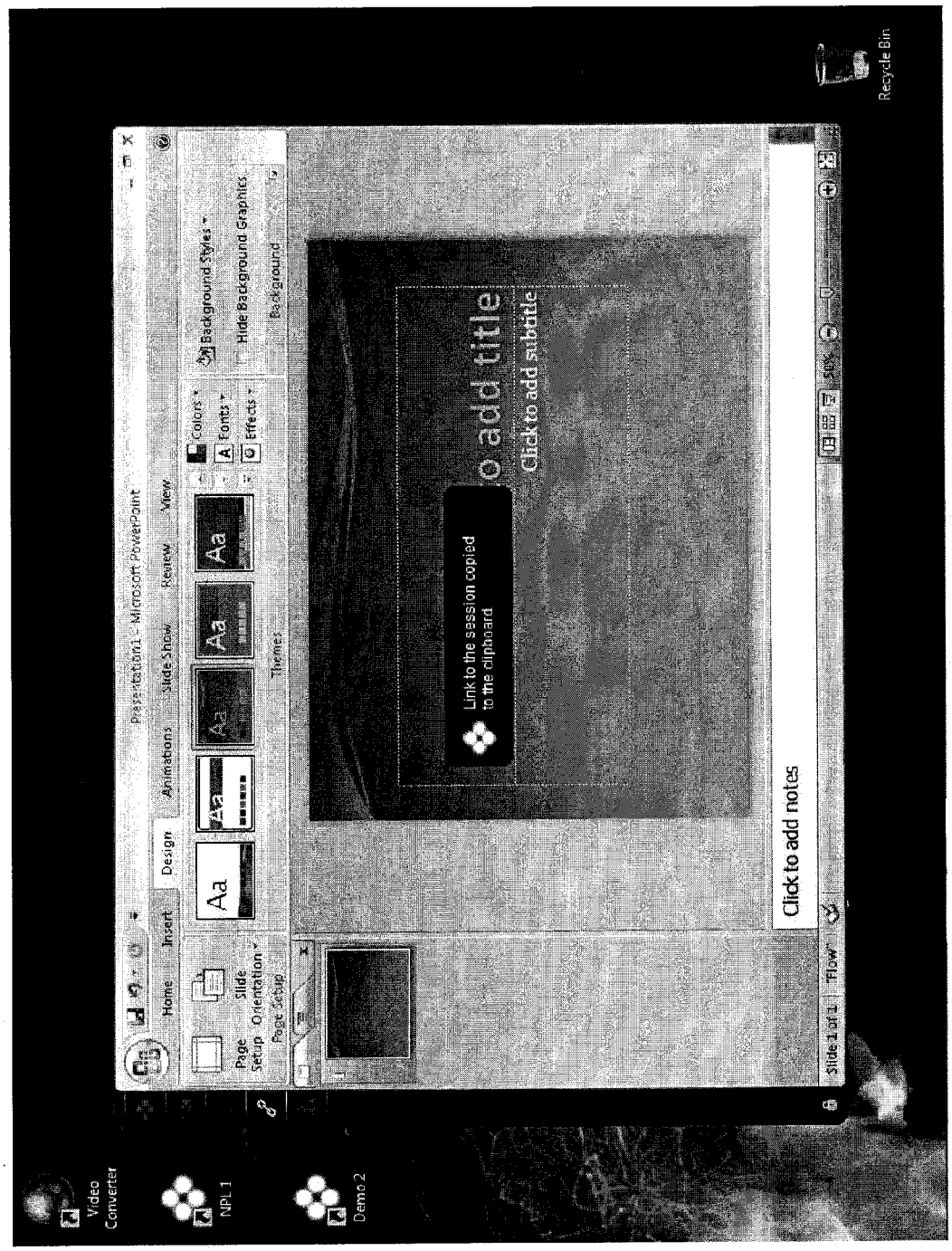

FIGS. 10-16 demonstrate several dimensions available with a base layer generated by piece of code called Microsoft PowerPoint. For example, FIGS. 10-11 and 15-16 illustrate how an interactive frame layer can be merged with the PowerPoint layer. Further, FIGS. 12-14 illustrate how video chat layer(s) can be merged with the PowerPoint layer.

Figure 17:
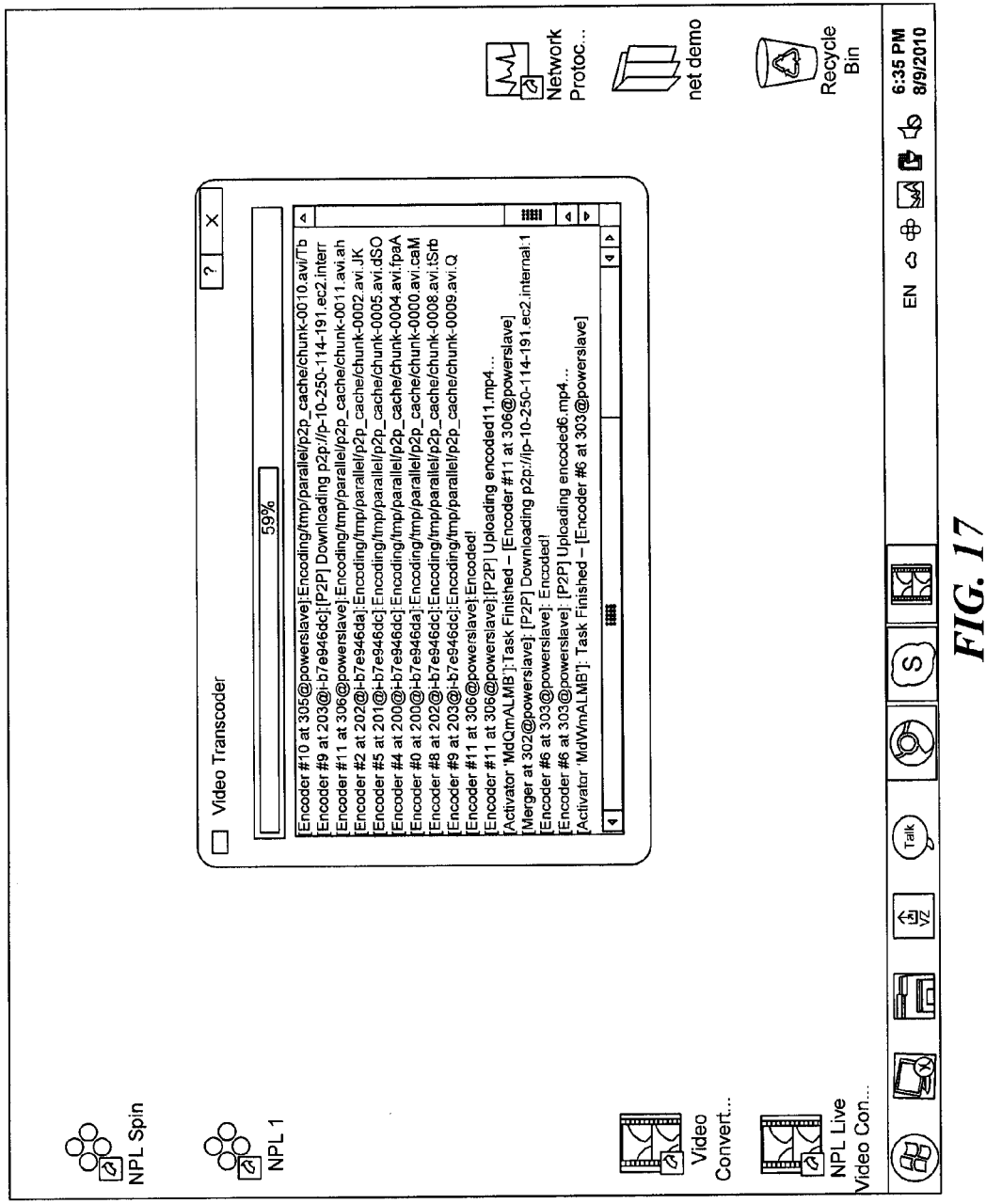
Figure 19:
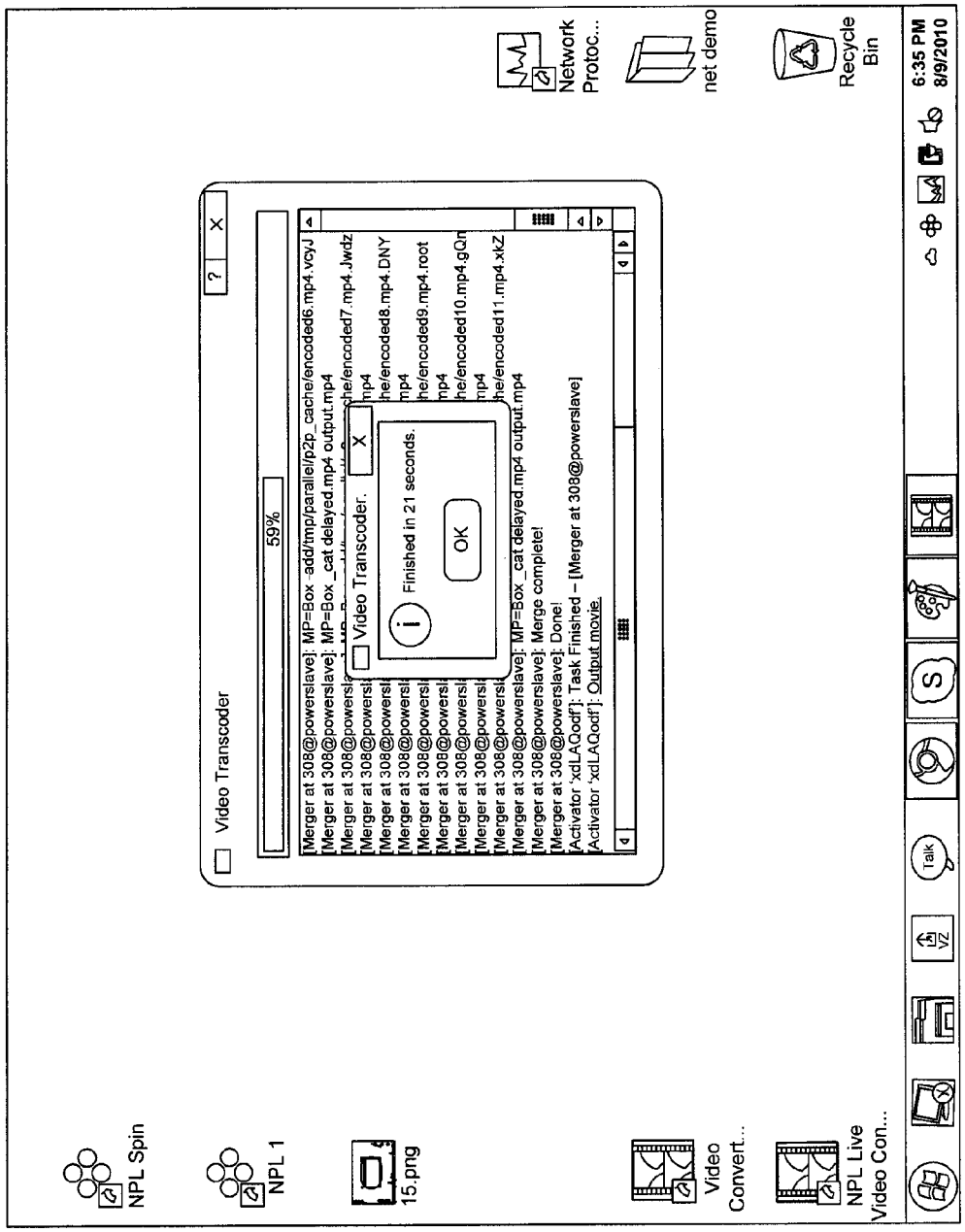

FIGS. 17-19 show a demonstration of a video transcoding service utilized by the transcoding application, and incorporating a third-party service. Implementation of the transcoding service can be built, for example, on top of Amazon Web Services. In particular, this illustrates distributing the video transcoding service over a plurality of virtual machines instantiated by the third-party service.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

We claim:

1. A system for composing and directing multi-dimensional participant experiences, the system facilitated via a low-latency transmission protocol and sentio codecs for encoding and decoding multi-dimensional data streams, the system provided by a service provider for use by an experience provider, the system comprising:
    an experience server in communication with a plurality of devices, the experience server including:
    a experience agent, the experience agent including a API and a sentio codec; and
    an experience composition engine;
    a content server in communication with the experience server and operable to provide a content layer to the experience composition engine;
    a service platform in communication with and operable to provide services to the plurality of devices and the experience server, the service platform including:
    a plurality of service engines; and
    wherein, the experience composition engine is operable to:
    receive layers from the content server and the plurality of devices;
    request services from the service platform via the experience agent, wherein at least one of the services includes data processed by the sentio codec; and
    compose and direct the layers using services performed by the service platform into a participant experience to be presented on at least one of the plurality of devices.

2. The system as recited in claim 1, wherein the plurality of devices are in communication via a wireless network.

3. The system as recited in claim 2, wherein at least some of the the plurality of devices are configured to provide a heterogeneous experience to a participant.

4. The system as recited in claim 1, wherein the sentio codec is configured to encode at least one dimension of the participant experience.

5. The system as recited in claim 1, wherein the experience server is configured to process a data stream from one or more of the plurality of devices associated with a dimension of the participant experience.

6. The system as recited in claim 1, wherein at least a portion of the experience server, the service platform, and the content server are instantiated in a distributed computing environment.

7. The system as recited in claim 1, wherein the experience composition engine is operable to process the data processed by the sentio codec for incorporation into a dimension of the participant experience.

8. The system as recited in claim 1, wherein the content layer provided by the content server is comprises video content.

9. The system as recited in claim 1, wherein the service engine is configured to determine a gesture of a participant from data received from one or more of the plurality of devices.

10. The system as recited in claim 1, wherein the experience composition engine is configured to direct the sentio codec data processing.

11. The system as recited in claim 10, wherein the sentio codec is configured to prioritize data for transmission in response to at least one dimension associated with the participant experience.

12. The system as recited in claim 1, wherein the sentio codec is configured to facilitate data stream priority in response to sensory data associated with the participant experience.

13. The system as recited in claim 1, wherein the sentio codec is configured to facilitate prioritization of data streams corresponding to different dimensions of an experience including layers provided by different application services.

14. The system as recited in claim 1, wherein the services engines are distributed across a plurality of servers.

15. The system as recited in claim 1, wherein each service engine has a corresponding experience agent including a corresponding API and a corresponding sentio codec configured to determine an emotion from data received from one or more of the plurality of devices.

16. A system for composing and directing multi-dimensional participant experiences, the system facilitated via a low-latency transmission protocol and sentio codecs for encoding and decoding multi-dimensional data streams, the system provided by a service provider for use by an experience provider, the system comprising:
   an experience server in communication with a plurality of devices, the experience server including:
      a experience agent, the experience agent including a API and a sentio codec; and
      an experience composition engine;
   a content server in communication with the experience server and operable to provide a content layer to the experience composition engine associated with the sentio codec;
   and
   wherein, the experience composition engine is operable to:
      receive one or more layers from the content server and the plurality of devices; and compose and direct the layers into a participant experience to be presented on at least one of the plurality of devices.

17. A system for composing and directing multi-dimensional participant experiences, the system facilitated via a low-latency transmission protocol and sentio codecs for encoding and decoding multi-dimensional data streams, the system provided by a service provider for use by an experience provider, the system comprising:
   an experience server in communication with a plurality of heterogeneous devices via a network, the experience server including:
      a experience agent, the experience agent including a API and a sentio codec; and
      an experience composition engine;
   a content server in communication with the experience server and operable to provide a content layer to the experience composition engine;
   and
   wherein, the experience composition engine is operable to:
      receive layers from the content server and the plurality of devices;
      request services from other devices via the experience agent, wherein at least one of the services includes data processed by the sentio codec; and
      compose and direct the layers, and services performed by the other devices into a participant experience to be presented on at least one of the plurality of devices.

18. An apparatus for composing and directing a multi-dimensional participant experience, the apparatus comprising:
   an input interface configured to receive at least some sensory data associated with a multi-dimensional data stream;
   a first experience agent, the first experience agent including an API and a sentio codec, the API configured to enable the first experience agent to communicate with a second experience agent, the sentio codec configured to process the multi-dimensional data stream from the second experience agent to define a multi-dimensional experience; and
   an output interface configured to present the multi-dimensional experience to the participant.

19. The apparatus of claim 18, wherein the multi-dimensional data stream comprises services directed by the second experience agent.

20. The apparatus of claim 18, wherein the multi-dimensional data stream comprises dimensions combined into layers to form the multi-dimensional experience.

* * * * *

UNITED STATES PATENT AND TRADEMARK OFFICE
CERTIFICATE OF CORRECTION

PATENT NO. : 8,571,956 B2
APPLICATION NO. : 13/367146
DATED : October 29, 2013
INVENTOR(S) : Stanislav Vonog, Nikolay Surin and Tara Lemmey It is certified that error appears in the above-identified patent and that said Letters Patent is hereby corrected as shown below:

In the Claims

Col. 8, line 4, claim 17, please delete the word "heterogeneous".

Signed and Sealed this
Twenty-fourth Day of December, 2013

Margaret A. Focarino
*Commissioner for Patents of the United States Patent and Trademark Office*